3,457,666
FISH LURE
Clarence A. Klinkhamer, 6305 Grand Ave. S.,
Richfield, Minn. 55423
Filed Jan. 30, 1967, Ser. No. 619,490
Int. Cl. A01k 97/04, 85/00
U.S. Cl. 43—41                                   10 Claims

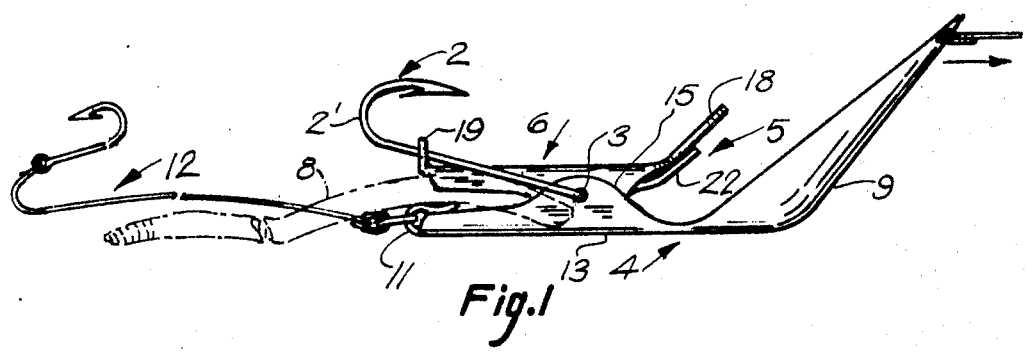
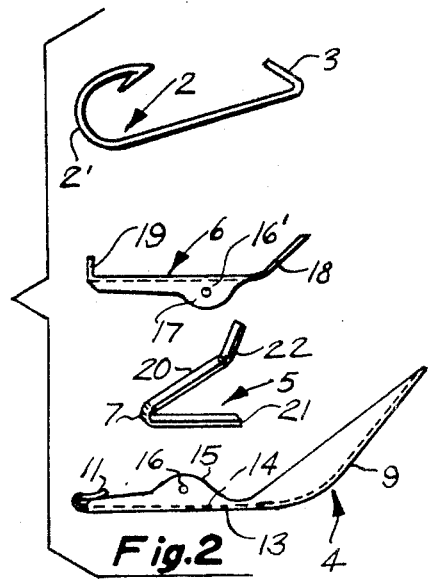
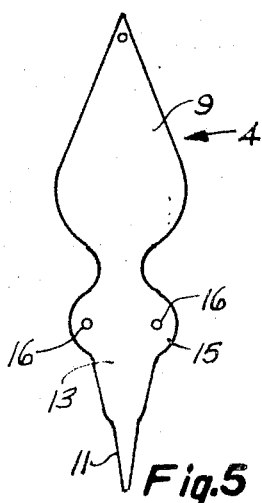
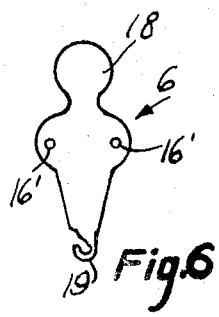
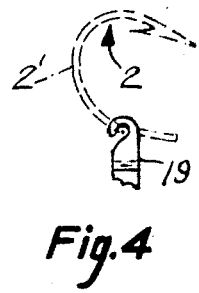
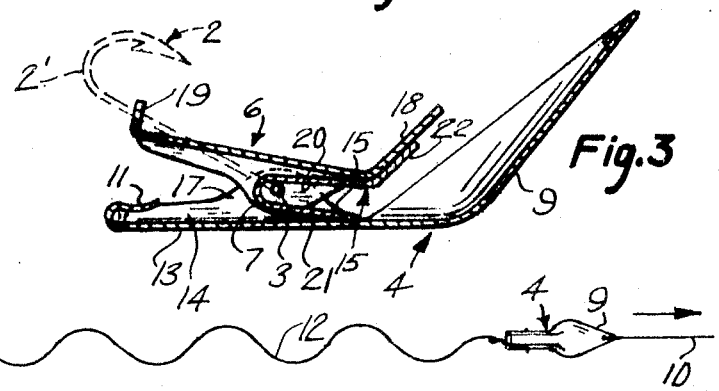
INVENTOR.
Clarence A. Klinkhamer United States Patent Office 3,457,666
Patented July 29, 1969

ABSTRACT OF THE DISCLOSURE

A spring actuated clip lure permitting use of various types of bait and comprising, in a detachable assembly, a fish hook and three sheet metal stampings, viz. a base member having a spoon at one end, a loop at its other end for the attachment thereto of an additional lure, and a channeled intermediate section; a U-shaped spring seated in the base member, and a clip normally closed by the tension of the spring member, the hook having a lateral projection providing a shaft on which the clip is mounted for rocking movement. In operation the hook rides up instead of down, will skim across weed beds and the lure gives a swimming action to the bait.

---

The present invention relates to fish lures in general and more particularly to one of new, novel and simple construction in which all parts, with exception of the hook, per se are of stamped metal and easy to assemble, this being a main object of the invention.

Another object of the invention is to provide a clip-type of lure adapted to use various kinds of bait such as pork rinds, worms, live and/or plastic craw fish, etc.

A further object is to provide a lure having integrally formed therewith an additional clip to which may be attached other lures as bucktails, spinners and the like.

Still a further object is to provide a lure which gives a swimming action to the bait and in which the hook rides up instead of down thus permitting the lure to skim across weed beds.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit and scope of the invention as set forth in the specification and particularly defined in the appended claims.

In the drawing:

FIGURE 1 illustrates in side view a preferred embodiment of the invention, the lure being seen in substantially fully closed condition with the attached bait indicated in phantom outline;

FIGURE 2 is an exploded view showing in profile the components of the lure;

FIGURE 3 is a vertical sectional view taken longitudinally of the lure of FIGURE 1;

FIGURE 4 is a structural detail to be explained;

FIGURES 5 and 6 illustrate in plan view the die-cut blanks from which the base and clip members of the lure are formed; and FIGURE 7 is a schematic illustration of the lure in action.

In the drawing like reference numerals refer to similar parts throughout the several views.

At 2 is a single fish hook the forward end of the shank portion of which is turned laterally to provide a printle or shaft 3 later to be explained.

Seen generally at 4, 5 and 6 are, respectively, a base member of the lure, a flat spring formed with a return bend 7 intermediate its ends, and a clip member which, in conjunction with the base member 4 and actuated by the spring 5, normally clamps the bait to the device, the bait being indicated in phantom lines at 8 in FIGURE 1.

The three parts just above enumerated are sheet metal stampings, the blanks from which the parts 4 and 6 are made being shown at 4' and 6' in FIGURES 5 and 6.

The member 4 provides a base upon which the other components of the lure are assembled. It includes an upwardly inclined, forwardly extending concavo-convex spoon portion 9 perforated at its outer, pointed end for attachment thereto of a fish line 10; a narrow rear extension 11 doubled upon itself to form a coupling to which a tail ender hook assembly 12 see FIGURES 1 and 7, or other lure, may be attached; and, an intermediate portion 13 the side edges of which are turned upward to form a longitudinal channel 14 and have rounded center portions 15, the latter having transversely aligned perforations 16 for receiving the laterally extending member 3 of the hook 2.

The blank illustrated in FIGURE 6, when die-pressed, becomes the clip member 6 of the lure and in effect constitutes a cover for the channel 14 and with the base member 4 provides a longitudinally extending space into which the bait 8 is inserted. Depending side wall of the clip 6 slidably engage the inner faces of the rounded portions 15 of part 4 and are also formed with rounded portions 17 which, like the portions 15, have transversely aligned perforations 16' through which the hook member 3 also is extended. It will thus be observed that the lateral extension 3 of hook 2 becomes a common axis upon which both the members 4 and 6 are fulcrumed.

The forward end of clip 6 is formed with a thumbpiece 18 having an inclination substantially the same as the spoon 9 of member 4. The other end of the clip 6 is slotted and bent upward into the formation of a hook 19 for detachably receiving the shank of the hook 2 at a point in proximity to the bend 2' in the hook.

The spring 5 employed as the means for yieldingly holding the clip 6 in bait clamping position is, in this instance, a strip of flat spring steel doubled upon itself to form a return bend 7 and side arms 20 and 21, the free end of arm 20 terminating in an angular portion 22. In assembly of the lure the arm 21 of spring 5 is seated in the channel 14 and in contact with the intermediate portion 13 of base member 4, the bend 7 engaging around the fulcrum of axis member 3, while the angular extension 22 of arm 20 engages the under surface of the like angular extending thumb-piece 18 of clip 3.

From the foregoing it will readily be observed that with manual pressure exerted against the thumb-piece 18 of clip 6 the cooperating clamping members 4 and 6 will be spread relatively apart, as in FIGURE 3, to permit insertion of the bait 8 between them and that, when such pressure is released, spring 5 will function to move the parts 4 and 6 relatively toward each other in clamping engagement with the bait, as in FIGURE 1. And, it will also be observed that the tension of spring 5 is also exerted on the shank portion of hook 2, tending to bow it and place the fish hook under such spring tension as to hold it in locking engagement with the slotted hook 19 of clip 6.

As herein above stated the clip lure of this invention gives swimming action to the bait being used. Also, the depth desired for fishing can be controlled by the fisherman. If you wish to fish deep, you simply reel slowly. If you want to fish the surface, you reel faster. In either instance the lure will skim across weed beds as the hook rides up instead of down as illustrated.

What I claim is:

1. A fish lure comprising: two elongated bait holding members located in parallel spaced relation, one above the other, and mounted intermediate their ends for relative rotary movement about a common axis, a fish hook including a shank portion, the forward end of the intermediate portion of the lower one of said bait holding members terminating in an upwardly inclined forwardly extending spoon portion and, the opposite end of the said intermediate portion terminating in a return bend for the attachment thereto of an additional lure, a spring having side arms and a mid-portion interposed between said bait holding members with said axis lying within and adjacent to said mid-portion, said side arms located in yielding contact with respective opposing faces of the bait holding members to normally hold the bait holding members in operative closed position, lock means integral with the upper one of the bait holding members to releasably engage said shank of the hook at a point adjacent the bend in the hook, and manually operable means for compressing said spring and permitting movement of said bait holding members to an operative open position.

2. The combination according to claim 1 characterized by the forward end of the intermediate portion of the upper one of said bait holding members terminating in an upwardly inclined forwardly extending thumb piece, the said shank locking means comprising an upstanding slotted projection at the opposite end of such intermediate portion and, the free end of the upper arm of said spring being angularly extended to lie against the under face of said thumb piece.

3. The combination according to claim 1 wherein the said upper and lower elongated bait holding members are sheet metal stampings and said spring is a U-shaped flat steel bar.

4. A fish lure comprising: an elongated channeled base member including an upwardly inclined forwardly extended spoon at its forward end, an inverted channeled clip member spaced above said base member and in the vertical plane thereof, a U-shaped tension spring seated in the channel of said base member with one arm contacting said base member and its other arm in contact with said clip member, an angularly disposed fish hook including an upward riding hook portion, a shank and a lateral extension at the free end of said shank, said extension pivotally connecting the base member and clip member providing a common axis of rotation of the base member and clip member, said axis lying within and adjacent to the return bend of the spring, said clip member at its forward end including an angularly extending thumb piece for the manual compression of said spring and an upwardly extended slotted projection at its rear end for releasably holding in locking engagement the shank of said fish hook at a point thereof adjacent the return bend of said hook.

5. The fish lure of claim 4 wherein the base member has a forwardly turned extension for the attachment thereto of an additional lure.

6. A fish lure comprising: two elongated bait holding members located adjacent each other, means pivotally connecting intermediate portions of the members for relative rotary movement about a common transverse axis, a fish hook mounted on one of the members, said hook having a shank and a lateral extension at the free end of the shank, said extension comprising the means pivotally connecting the bait holding members, biasing means interposed between said members to normally hold the members in an operative closed position and manually operated means for compressing said biasing means to move said bait holding members to operative open position.

7. The fish lure of claim 7 including connecting means on the rear portion of one of the members for attaching an additional lure thereto, said connecting means located between the members whereby when the members are in an operative closed position the additional lure is retained in the connecting means.

8. The fish lure of claim 6 including lock means on the upper bait holding member for releasably engaging the shank of the hook adjacent the bend.

9. The fish lure of claim 6 including lock means on one of the bait holding members for releasably engaging the hook.

10. The fish lure of claim 6 wherein the lower bait holding member has a forward portion comprising an upwardly and forwardly inclined spoon.

References Cited
UNITED STATES PATENTS

| | | | |
|---|---|---|---|
| 1,290,571 | 1/1919 | Kawasaki | 43—42.52 |
| 2,754,613 | 7/1956 | Rogers et al. | 43—42.28 X |
| 2,812,609 | 11/1957 | Lema | 43—42.28 |
| 2,884,733 | 5/1959 | Smith | 43—42.52 X |
| 2,940,208 | 6/1960 | Oswald | 43—44.6 |

ALDRICH F. MEDBERY, Primary Examiner

U.S. Cl. X.R.

43—42.28